US012144769B2

(12) United States Patent
Purdue et al.

(10) Patent No.: US 12,144,769 B2
(45) Date of Patent: Nov. 19, 2024

(54) TRANSFER AND EXERCISE ATTACHMENT AND METHOD FOR WHEELCHAIRS

(71) Applicant: Proactive Comfort, LLC, Chantilly, VA (US)

(72) Inventors: Carole Purdue, Grasonville, MD (US); Elvis Campana, Haymarket, VA (US)

(73) Assignee: Proactive Comfort, LLC, Chantilly, VA (US)

( * ) Notice: Subject to any disclaimer, the term of this patent is extended or adjusted under 35 U.S.C. 154(b) by 517 days.

(21) Appl. No.: 17/482,540

(22) Filed: Sep. 23, 2021

(65) Prior Publication Data

US 2022/0096296 A1 Mar. 31, 2022

Related U.S. Application Data

(60) Provisional application No. 63/085,184, filed on Sep. 30, 2020.

(51) Int. Cl.

| | |
|---|---|
| ***A61G 5/14*** | (2006.01) |
| ***A61G 7/10*** | (2006.01) |
| ***A63B 1/00*** | (2006.01) |
| ***A63B 21/00*** | (2006.01) |
| ***A63B 21/04*** | (2006.01) |
| ***A63B 21/055*** | (2006.01) |
| ***A63B 21/16*** | (2006.01) |

(52) U.S. Cl.

CPC ............. *A61G 5/14* (2013.01); *A61G 7/1038* (2013.01); *A63B 1/00* (2013.01); *A63B 21/0442* (2013.01); *A63B 21/0552* (2013.01); *A63B 21/1609* (2015.10); *A63B 21/4035* (2015.10); *A63B 2208/0233* (2013.01)

(58) Field of Classification Search

CPC .... A61G 5/14; A61G 7/1038; A63B 21/1609; A63B 21/4035; A63B 1/00; A63B 21/0442; A63B 21/0552; A63B 2208/0233

See application file for complete search history.

(56) References Cited

U.S. PATENT DOCUMENTS 4,759,562 A * 7/1988 Vinyard .................. A61G 5/10 482/68
5,058,912 A * 10/1991 Harroun .................. A61H 3/04 482/68
5,697,628 A * 12/1997 Spear ...................... A61G 5/12 297/487

(Continued)

*Primary Examiner* — Jacob D Knutson

(74) *Attorney, Agent, or Firm* — Edell, Shapiro & Finnan, LLC

(57) ABSTRACT

Stable transfer of a person from a wheelchair to another support facility, such as a bed or commode, utilizes a support bar having first and second legs depending vertically from respective ends of a transversely extending grip section. In a normal or exercise mode the lower ends of the bar legs can be selectively secured in respective sockets on opposite sides of the wheelchair with the grip section disposed horizontally in front of the wheelchair. In a transfer mode the bar is positioned with the lower end of the first leg removably engaging a bed or other support facility and the lower end of the second leg engaging to one of the wheelchair sockets such that the bar stably secures the wheelchair to the facility and the grip section can be grasped by a person transferring between the wheelchair and the support facility.

10 Claims, 7 Drawing Sheets

(56) References Cited

U.S. PATENT DOCUMENTS

| | | | | |
|---|---|---|---|---|
| 5,741,020 | A * | 4/1998 | Harroun | A61G 5/0883 280/42 |
| 2014/0371038 | A1 * | 12/2014 | Markowitz | A63B 21/0414 482/123 |
| 2018/0078816 | A1 * | 3/2018 | Su | A63B 22/001 |

* cited by examiner

TRANSFER AND EXERCISE ATTACHMENT AND METHOD FOR WHEELCHAIRS

CROSS-REFERENCE TO RELATED APPLICATIONS

This application is a non-provisional application claiming priority from U.S. Provisional Application No. 63/085,184, entitled "Transfer And Exercise Attachment and Method For Wheelchairs", and filed Sep. 30, 2020, the disclosure in which is incorporated in its entirety herein by this reference.

TECHNICAL FIELD

The present disclosure pertains generally to wheelchair accessories and, more particularly, to methods and apparatus for enabling wheelchair-bound person to alternatively: (a) stably transfer between a wheelchair and a bed or other support facility; and (b) perform various exercises while in the wheelchair.

BACKGROUND OF THE DISCLOSURE

A serious issue for wheelchair-bound persons is the danger of falling while attempting to transfer between the wheelchair and a bed or other support facility such as a commode. Several different types of structures have been suggested in the prior art to facilitate such transfers but they typically lack the stability and safety required, are inconvenient to use, and/or add considerably to the cost of the wheelchair. One such structure is a transfer board used as a bridge between the wheelchair and bed to permit the patient to sit and slide on the board between those support facility units. Transfer boards are typically positionally secured only at the wheelchair but not at the bed, thereby diminishing structural stability during patient transfer. It will be appreciated that structural stability during transfer is critical in order to prevent the disastrous consequences of patient falls. Moreover, the board must either be stowed as part of the chair structure when not in use, thereby rendering the structure unduly complex and expensive, or stored separately at some location near the bed where it can be misplaced and not be available when needed for a patient transfer.

Another prior art approach is illustrated in German Patent Application No. DE19951035932 (Joerg) titled "Standing Aid For Wheelchair Users", the entire disclosure of which is incorporated herein by reference. This approach requires two bridge members, each selectively attachable to respective sides of a wheelchair seat, to diverge from one another to selectively connect the wheelchair to a bed via respective brackets at the distal ends of the bridge members. The resulting trapezoidal area created between the wheelchair seat and bed side by the diverging bridges permits a user to lift himself/herself from the wheelchair by pushing up and leaning on the bridges, turn around in the provided trapezoidal space, and then sit on the bed. A similar motion is required to transfer from the bed to the wheelchair. There are significant disadvantages to this arrangement. First, the user must twist his/her body 180° and switch hands on the respective bridges while turning around in the space, leading to the possibility of a fall. In addition, the bridges, when not in use for a patient transfer, have no other function and must be stowed or stored separately at some location near the bed where they may be misplaced and unavailable when needed for a subsequent patient transfer.

It is also known in the prior art to provide attachments to wheelchairs that permit wheelchair occupants to perform upper body strengthening exercises while in the chair. For example, U.S. Pat. No. 5,697,628 (Spear) discloses an exercise bar that may be removably attached to opposite sides of a wheelchair to extend horizontally in front of the occupant. When so deployed the bar can be grasped by the occupant who can then repetitively pull himself or herself up to strengthen arm and torso muscles, and also perform lower body exercises while standing and gripping the bar. When not used for exercise, the bar has no other function and must be stowed or stored where it may be misplaced and unavailable when needed for a subsequent transfer.

In view of the above it is desirable to provide an apparatus that permits a person to easily and stably transfer between a wheelchair and bed or other support facility, and when not in such use can remain in place on a wheelchair to serve as an exercise bar.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one aspect, disclosed herein is an exercise and transfer bar comprising first and second legs depending substantially vertically from respective ends of a transversely extending grip section, the bar having an exercise position wherein the lower ends of the first and second legs are configured to simultaneously removably engage respective first and second connectors rigidly secured on opposite sides of a wheelchair to thereby extend said grip section horizontally in front of said wheel chair, the bar also having a transfer position wherein the lower end of at least the first leg is configured to removably engage a third connector rigidly secured to a patient support facility, such as a bed, commode, or the like, separate from the wheelchair while the lower end of the second leg engages the second connector and the grip section extends substantially horizontally between the wheelchair and the patient support facility More specifically, disclosed herein is an integral tubular bar having a transversely extending grip section joining two depending legs that may be removably engaged in respective mounting hubs or sockets located forward of the seat on opposite sides of a wheelchair so that the grip section is positioned horizontally in front of the occupant in what is referred to herein as an exercise position. When so positioned the bar may be grasped by the occupant to assist in standing and to enable performance of exercises, including lower body strengthening exercises and other therapeutic movements. The bar may be transformed into a transfer aid by removing one leg of the bar from its engagement with its socket on the wheelchair and inserting it in a suitably configured hub or socket mounted on the frame of a bed or other support facility. In this position the bar serves as a stable bridge between the wheelchair and bed that can be grasped and held by the transferee with one or both hands throughout an entire transfer process as the transferee stands and pivots his/her body between the wheelchair and bed.

Advantageously, while positioned to serve as an exercise bar with each leg attached in a respective wheelchair socket, the device may have one or both ends of one or more elastic resistance bands tied or otherwise secured thereto to enable a seated occupant to repetitively pull against the resistance of the bands and thereby perform upper body conditioning and strengthening routines to maintain his/her upper body strength. Alternatively, with the bar so deployed it can be grasped by the occupant who can then repetitively pull himself or herself up to strengthen his/her arm and torso muscles, and also perform lower body exercises while standing and gripping the bar. In addition, by extending transversely in a securely mounted position in front of the occupant, the bar provides a safe and secure barrier for the occupant against falling from the wheelchair.

Also disclosed herein is a method of providing for stable transfer of a person from a wheelchair to another support facility using a support bar having first and second legs depending substantially vertically from respective ends of a transversely extending grip section, wherein lower ends of the legs can be selectively secured in respective supports on opposite sides of the wheelchair with the grip section disposed horizontally in front of the wheelchair, the method comprising removably engaging the lower end of the first leg with a support facility and removably engaging the lower end of the second leg to one of the wheelchair supports such that the bar stably secures the wheelchair to the facility and the grip section can be grasped by a person transferring between the wheelchair and the support facility.

The above and still further features and advantages of the disclosed embodiments will become apparent upon consideration of the definitions, descriptions and descriptive figures of specific embodiments thereof set forth herein. In the detailed description below, like reference numerals in the various figures are utilized to designate like components and elements. While these descriptions go into specific details, it should be understood that variations may and do exist and would be apparent to those skilled in the art in view of the following description.

BRIEF DESCRIPTION OF THE DRAWINGS

By way of example, a specific embodiment of the disclosed device will now be described, with reference to the accompanying drawings, in which.

DETAILED DESCRIPTION OF THE DRAWINGS

Figure 1:
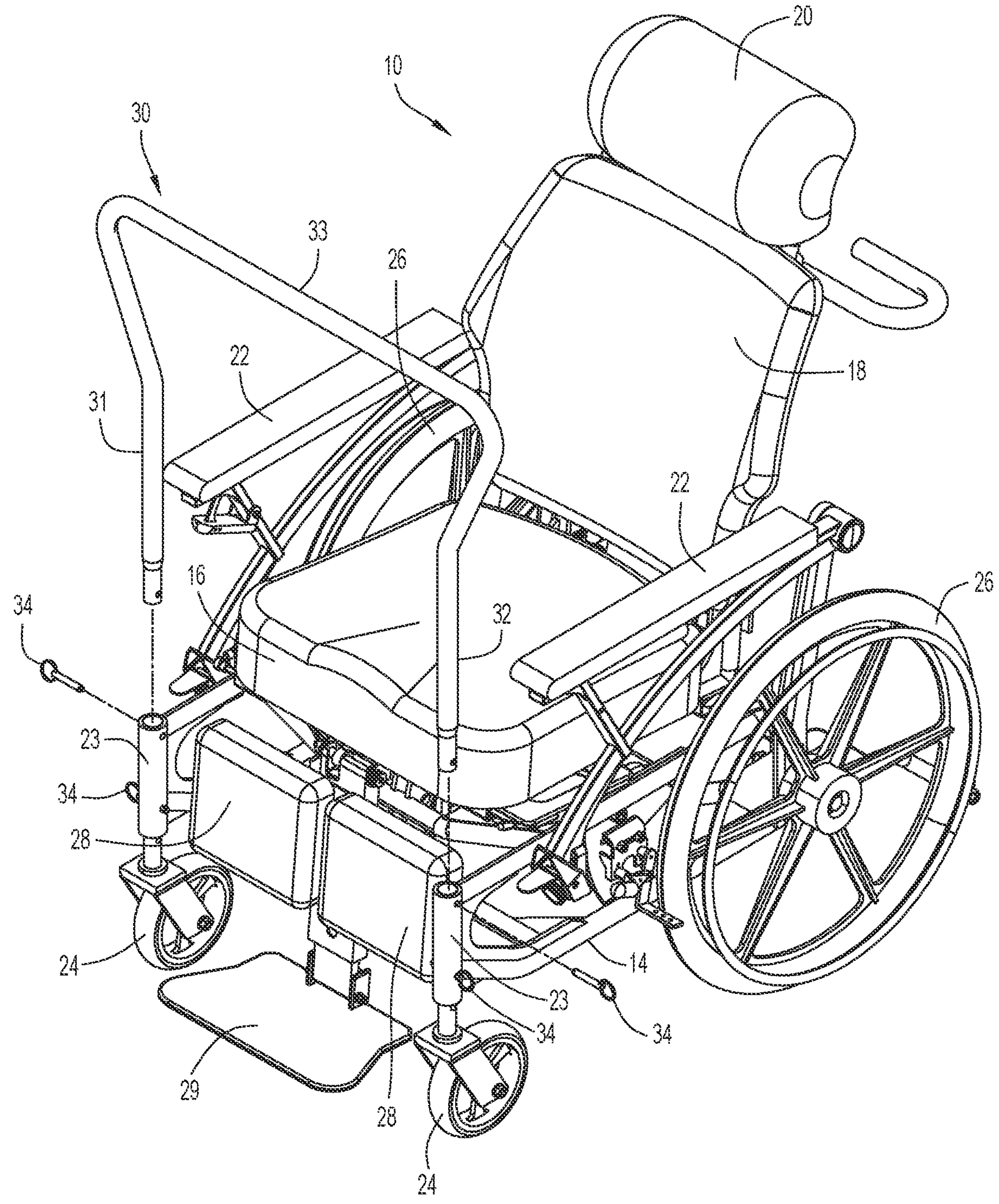
FIG. 1 is a perspective view, partially exploded, showing a wheelchair with a transfer and exercise bar raised above its exercise position prior to attachment.
Figure 2:
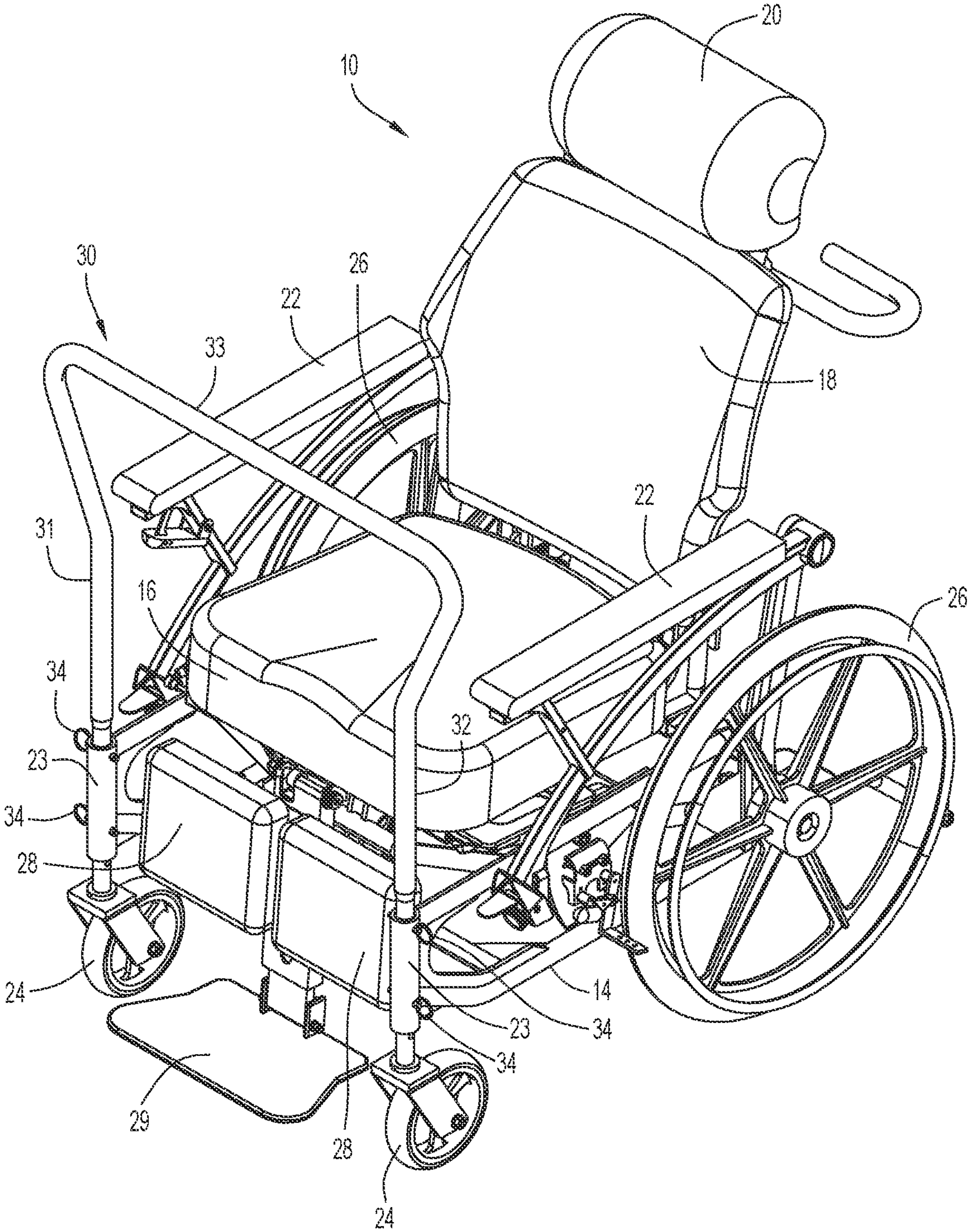
FIG. 2 is a perspective view of the wheelchair and transfer and exercise bar of FIG. 1 showing the bar secured in its exercise position.
Figure 3:
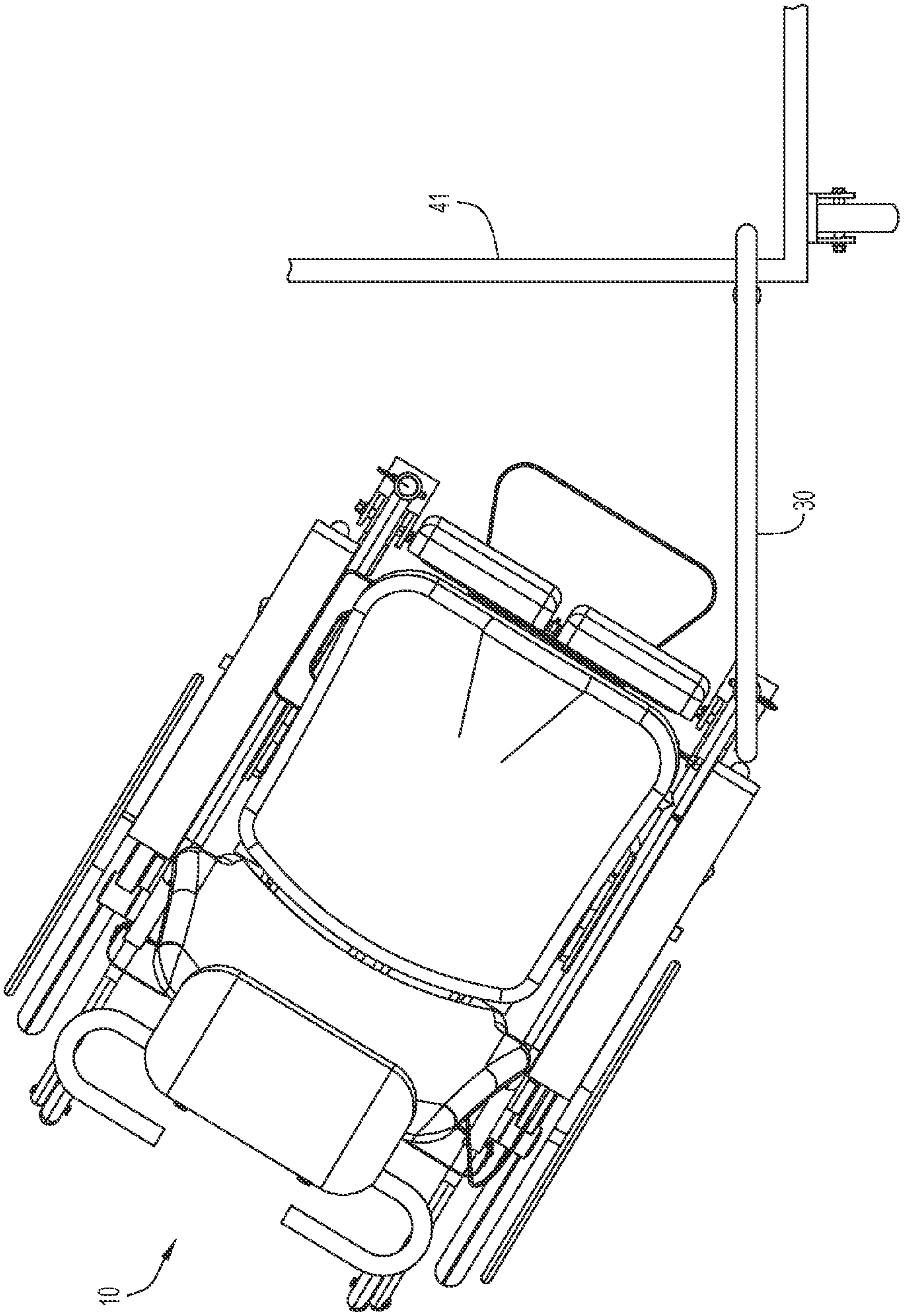
FIG. 3 is a plan view from above of the wheelchair and transfer and exercise bar of FIG. 1 showing the bar in its transfer position with one leg of the bar engaging a bed.
Figure 4:
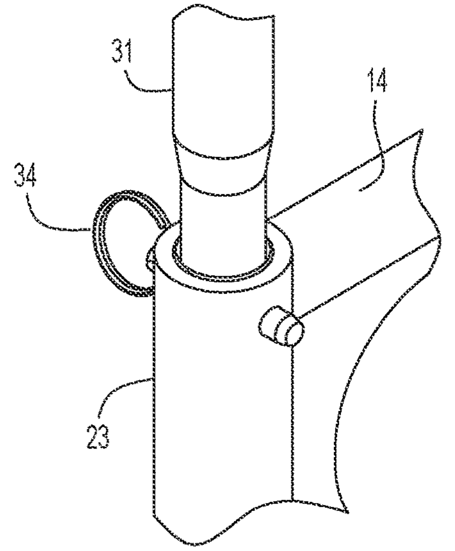
FIG. 4 is perspective detail view of a mounting hub on the wheelchair of FIG. 1 engaging the distal end of a leg of the transfer and exercise bar.

Examples of embodiments will now be described more fully hereinafter with reference to the accompanying drawings, in which exemplary embodiments are shown. It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The disclosed concepts may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the disclosed embodiments should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

As used herein the terms "front" and "forward" refer to the horizontal direction a wheelchair patient or occupant is facing when seated in the wheelchair, and the terms "rear" "reverse" refer to the opposite direction. The term "transverse" as used herein refers to the horizontal direction perpendicular to forward and rearward. The terms "upper", "lower", "top" and "bottom" refer to the orientations of components in their normal use. The terminology "support facility" as used herein broadly refers to a bed, chair, commode or other structure on which a patient can be supported in a sitting or reclining position and to or from which a patient may transfer with the aid of the transfer bar described herein.

Referring more specifically to the accompanying drawings, there is shown a wheelchair 10 comprising a frame 14 on which a seat 16 and a back rest 18 are mounted for supporting a patient/occupant in the proper sitting position in the wheelchair. A head support 20 extends upward from the upper edge of the back rest 18. Arm rests 22 are provided on respective sides of the seat 16, elevated from the seat, for supporting the forearms of the occupant.

Two transversely spaced front caster wheel assemblies 24 are mounted to depend from the bottom ends of respective substantially vertical engagement tubes 23 located at the front end of frame 14 to permit the wheels to swivel and the wheelchair to freely roll along a floor or other substantially planar surface. Specifically, each assembly 24 includes a rod extending upward and concentrically into the bottom end of a respective engagement tube 23 where it is positionally locked against vertical and rotational movement in a conventional manner, e.g., by a locking pin or dowel 34 extending through aligned apertures in the rod and engagement tube. Two drive wheels 26 are transversely spaced and secured to respective sides of frame 14, rearward of front wheels 24, and may be of the conventional type whereby they can be manually grasped and individually rotated by a seated occupant to propel the wheelchair in a forward or reverse direction or turn the wheelchair. As shown, the wheelchair may also include conventional calf pads 28 and a footrest 29.

In accordance with the present disclosure, an exercise and transfer bar 30 preferably takes the form of an integral tubular member having two transversely spaced parallel and coplanar legs 31 and 32 joined at their upper ends by a transversely extending grip section 33. In the illustrated embodiment grip section 33 and legs 31, 32 are coplanar; however, it is to be understood that the bar may be bent so that the grip section is out of plane to reside forwardly or rearwardly of the plane of the legs. Likewise, although grip section 33 is shown as being linear throughout its length, it is to be understood that it may include bends configured to facilitate gripping by a patient during a transfer procedure. To expand the length of the grip section beyond the nominal width of wheelchair, the upper ends of legs 31, 32 may be bent, as shown in the illustrated embodiment, to diverge from one another, typically at an angle between 10° and 45° from vertical, and then bend back toward one another (preferably arcuately, as shown) into coaxial alignment to comprise respective ends of grip section 33.

The cross-sectional diameter of exercise and transfer bar 30 is such that the lower ends of legs 31, 32 may be telescopically inserted concentrically into the open upper ends of respective engagement tubes 23 where they may be selectively secured against vertical and rotational movement in a conventional manner, such as by a locking pin or dowel 34 extending through aligned apertures in the leg and engagement tube. With both legs of the transfer bar thusly locked in place in the engagement tubes, grip section 33 is stably positioned horizontally immediately forward of seat 16 where it can serve as a barrier and be reliably gripped by a seated occupant for purposes of performing exercises, including upper and lower body strengthening exercises and other therapeutic movements.

When an occupant desires to transfer from the wheelchair to a bed or other facility, the legs 31, 32 of exercise and transfer bar 30 are disengaged from the wheelchair by removing the locking pins 34 or other locking mechanisms that retain the legs in their respective engagement tubes 23. The transfer bar is then raised so that it can be pivoted about one leg (leg 31, for example) which can then can be reinserted into its engagement tube 23 while the other leg 32 is inserted into a socket 40 that is rigidly secured to the frame of a bed 41 or other support facility. Of course, it is desirable that the brake on the wheelchair be activated to prevent movement of the wheelchair during the patient transfer. The legs may be then positionally locked in their new receivers with dowel pins, or the like. With the legs thusly engaged the patient/occupant can grasp the grip section 33 with one or preferably both hands, stand in front of the wheelchair, and turn to sit on the bed, all the while grasping the stably engaged transfer bar 30. It is to be understood that the terminology "socket" or "hub" as used herein is intended to mean any connector for removably receiving or engaging the lower end of a leg of bar 30.

It will be appreciated that the method of transferring a patient disclosed herein, in a broad sense, comprises removably engaging the lower ends of the first and second legs with respective connectors rigidly secured the first and second patent support facilities in an orientation such that the bar stably secures the first and second patient support facilities to one another in a manner permitting the grip section to be grasped by a patient transferring between the patient support facilities. More specifically, the method may be viewed as removably engaging the lower end of the first leg of the bar with a support facility and removably engaging the lower end of the second leg to a wheelchair support such that the bar stably secures the wheelchair to the facility and the grip section can be grasped by a patient transferring between the wheelchair and the support facility. The terminology "removably engaging" as used herein means that the lower ends of the legs can be attached as described in order to permit a stable patient transfer and can then be detached to permit the bar to be secured in front of the patient in the wheelchair, as described, or stowed or stored.

While in its exercise position bar 30 may have one or both ends of one or more elastic resistance bands 42, 43 tied or otherwise secured thereto to enable a seated patient to pull against the resistance of the bands 42, 43 and thereby perform upper body conditioning and strengthening routines to maintain his/her upper body strength. Alternatively, with the bar so deployed it can be grasped by the patient who can then repetitively pull himself or herself up to strengthen arm and torso muscles, and also perform lower body exercises while standing and gripping the bar. In addition, by extending transversely in a securely mounted position in front of the patient, the bar provides a safe and secure barrier for the patient.

Although not illustrated it is to be understood that the grip section may be coaxially surrounded with one or more cylindrical foam pads extending along all or part of the grip section length to facilitate gripping by, and provide forearm rests for, the seated patient.

The preferred embodiment of bar 30 is a hollow metal tube, typically steel, to minimize weight; however, it will be understood that the bar may comprise a solid rod or other structure consistent with the functions described herein. Likewise, although the disclosed means for attaching the bar to the wheelchair and bed is a socket for slidably receiving the bar, any suitable selective engagement means, consistent with the functions described herein, may be employed.

In one non-limiting example the resulting bend transition between grip section 33 and each leg 31, 32 has a radius of curvature of approximately two inches, the outer diameter of grip section 33 of the bar is one inch, and the outer diameter of the lower portion of each leg is 0.85 inch to fit into the engagement tube 23 and socket 40 which has an inside diameter of 0.875 inch.

In the preferred embodiment the transverse cross-section of legs 31, 32 is perimetrically circular as are the interior surfaces of the transverse cross-section of engagement tube 23 and socket 40. This arrangement of the mating cross-sections permits the legs, unless otherwise locked, to be rotatable within the engagement tube or socket, which may be advantageous in positioning the wheelchair relative to the bed or other support facility prior to a patient transfer. It should be noted, however, that if such rotatability is not desired, these cross-sections may be polygonal or otherwise irregular so as to prevent such rotation.

Although in the disclosed embodiment the lower end of legs 31, 32 are configured to be received in engagement tubes 23 and socket 40, the diameters of these structures may be chosen to permit the upper ends of the engagement tubes and socket to be received in the lower ends of the legs.

The present disclosure focuses on a primary embodiment employing the transfer and exercise bar with a wheelchair to enable stable patient transfer from the wheelchair to a bed. It should be understood, however, that the use of the bar is considerably broader. For example, the bar may be used to enable a patient to transfer from a bed to a bedside commode wherein frames of both the bed and commode are provided or retrofitted with suitable stably installed sockets for receiving and engaging the lower ends of the legs 31 and 32. In a still broader sense, the bar may be used to enable stable transfer between any two facilities that might be used by a patient by installing a suitable socket on the frames of those facilities. In a still further embodiment, two sockets may be installed on a bed, or on a stationary chair, so that the bar may serve the above-described exercise support functions for a person sitting on the bed or chair.

Figure 5A:
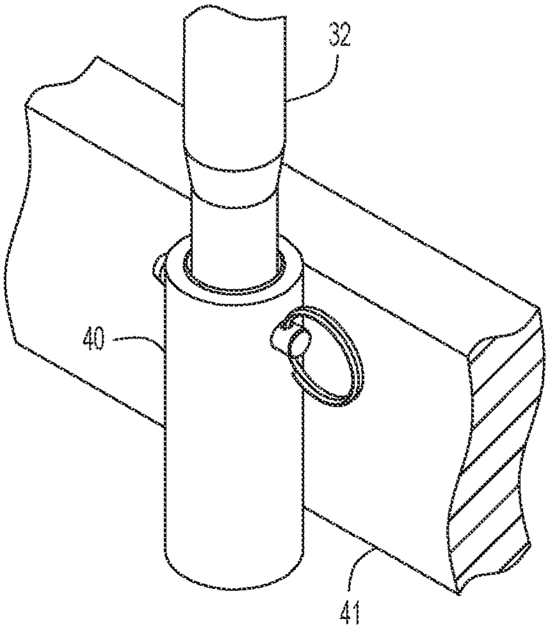
FIG. 5A is a detail view in elevation showing a socket member secured to the bed of FIG. 3 for receiving the distal end of a leg of the transfer and exercise bar.
Figure 5B:
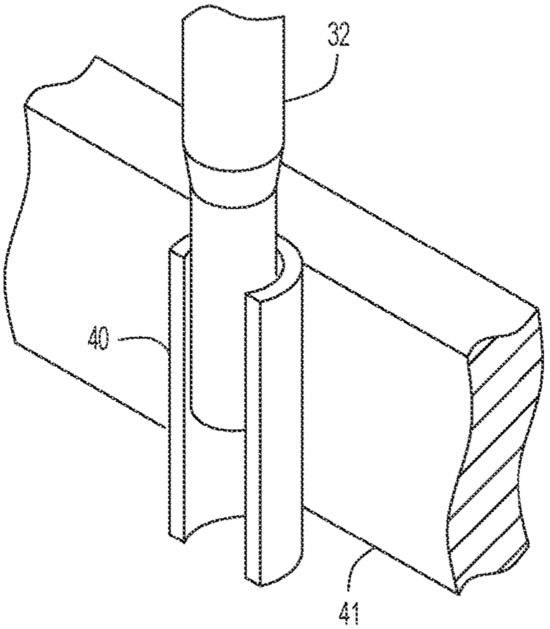
FIG. 5B is a detail view showing an alternative configuration for the socket member secured to the bed of FIG. 3.
Figure 6:
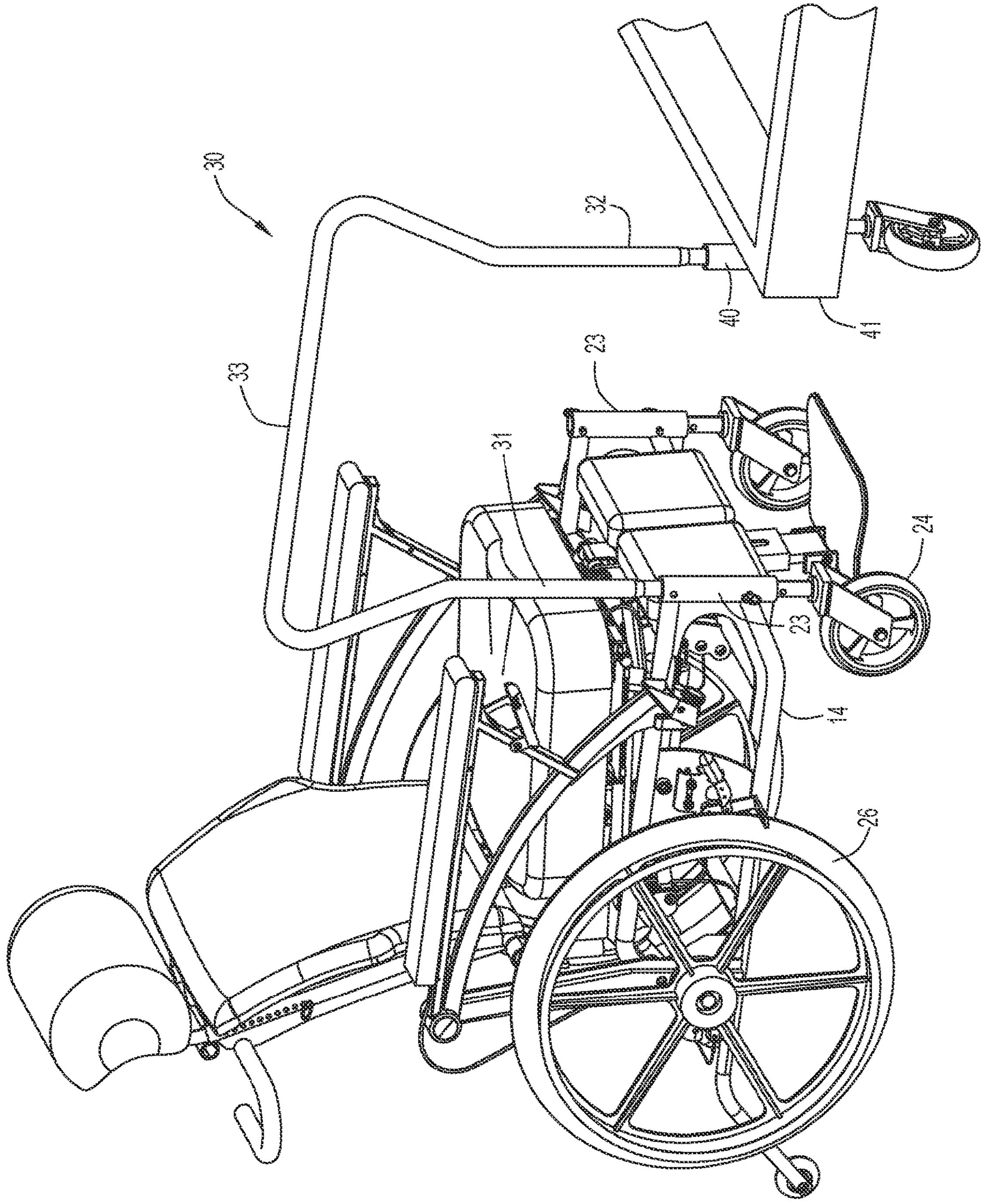
FIG. 6 is a perspective view of the wheelchair and bar of FIG. 1 showing the bar in its transfer position with one leg of the bar engaging a bed.
Figure 7:
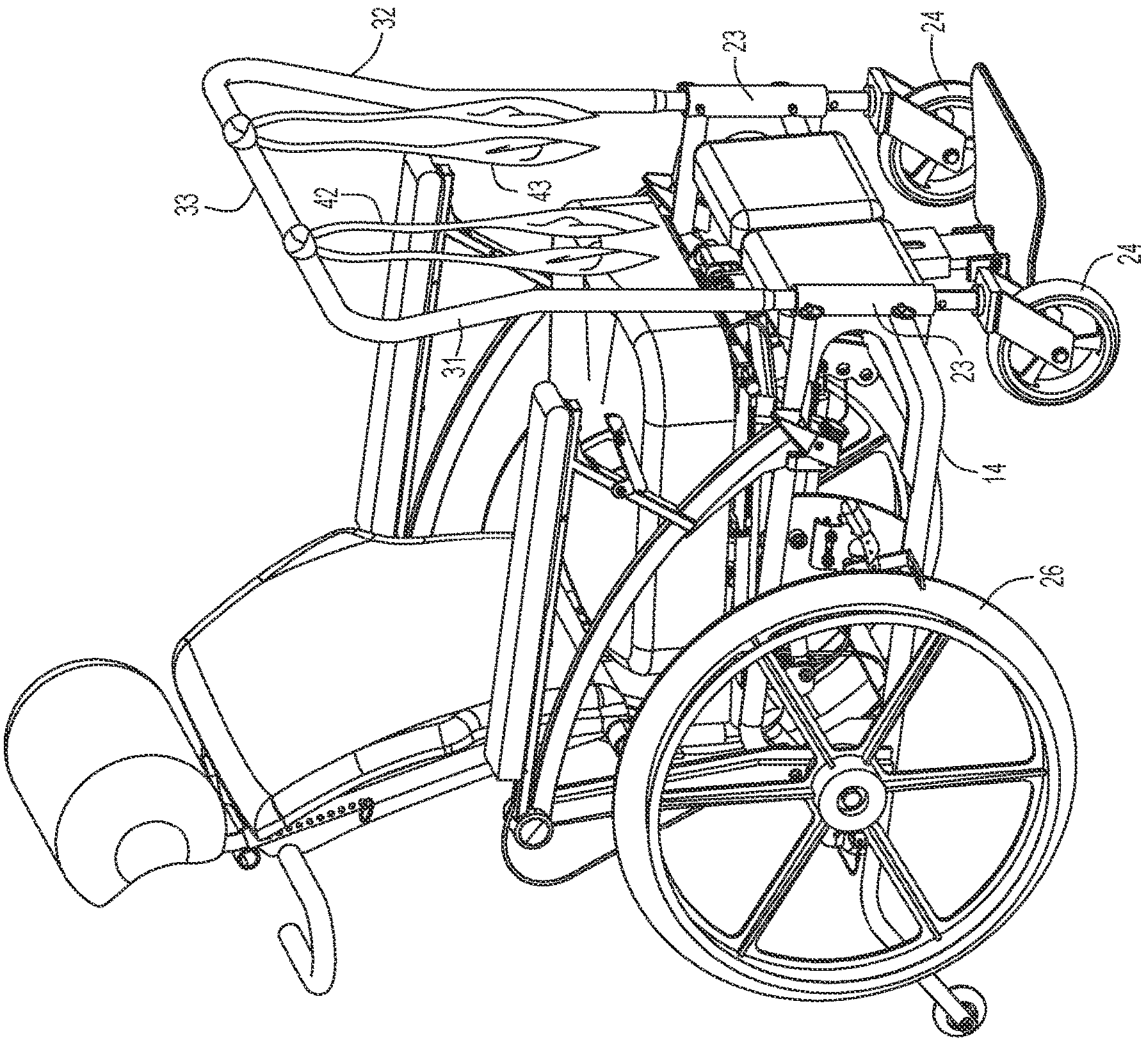
FIG. 7 is a perspective view of the wheelchair and bar of FIG. 1 showing the bar in its exercise position.
Figure 8:
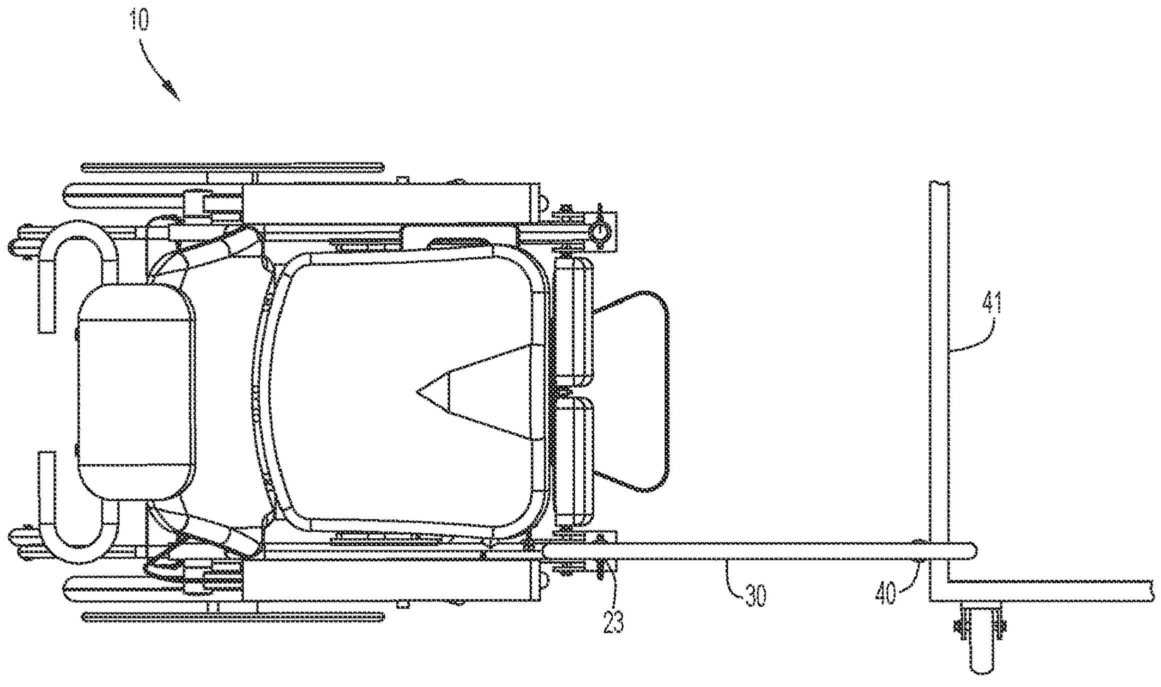
FIG. 8 is a plan view from above of the wheelchair and transfer and exercise bar of FIG. 1 showing the bar in its transfer position with one leg of the bar engaging a bed.
Figure 9:
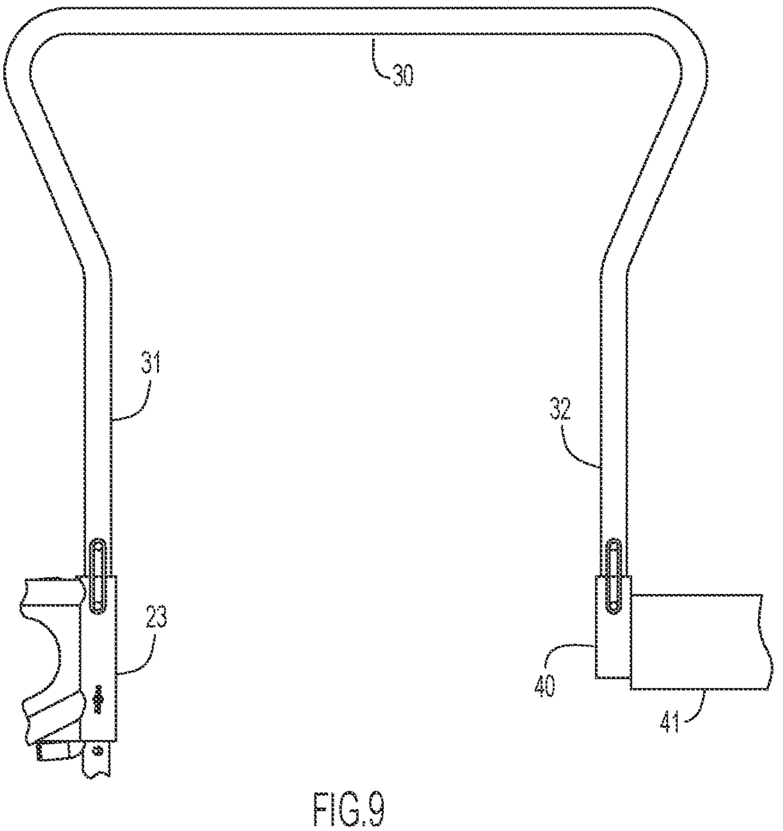
FIG. 9 is an elevation view of the transfer and exercise bar of FIG. 1 shown with the distal ends of its legs engaged at the wheelchair and bed.

It will be noted that because the normal position of bar 30 is secured to the wheelchair 10 with the lower ends of legs 31, 32 engaged in respective sockets 23 having coplanar upper openings, in order for the grip section 33 to be horizontal the legs must have substantially the same length. The effect of this on a transfer to a bed, for example, means that the upper end of bed socket 40 must be coplanar with the upper ends of sockets 23, an arrangement that is not always possible depending on the configuration of the bed frame. Also, the legs must be inserted into sockets 23 and 40 in a manner requiring simultaneous coaxial alignment of each leg and socket pair, a procedure which may be less than convenient, or even possible for some wheelchair occupants. In order to overcome this inconvenience the socket 40 on the bed or commode may be open at its exposed side, as illustrated in FIG. 5B, to receive a leg 31 or 32 transversely rather than longitudinally. For example socket 40 may have an interior wall with a radius of curvature allowing it to engage or contact a leg 31 or 32 while perimetrically extending only 180° or less. The leg may be secured in such socket in any convenient manner, such as by a dowel pin extending through aligned apertures in the engaged parts as a chord rather than as a diameter. It will be understood that with the partially enclosed socket, bar 30 may deployed with a firs let (e.g., leg 31) engaged in a respective wheelchair socket by inserting that leg axially in the socket, whereby the other leg may then be inserted into the bed socket by pivoting the bar about leg 31 until leg 32 resides in the open-sided socket. As an alternative to an open socket, the socket may be provided slightly conical or with a funnel type upper end so as to enlarge the upper end of the socket to facilitate insertion of the lower end of a leg.

While the present disclosure has been set forth in terms of specific embodiments, it will be understood that the exercise and transfer bar for a wheelchair herein disclosed may be modified or altered by those skilled in the art to other configurations. Accordingly, the disclosure is to be broadly construed and limited only by the scope and spirit of the claims.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of providing for stable transfer of a person from a first patient support facility to a second patient support facility using a support bar having first and second legs depending substantially vertically from respective ends of a transversely extending grip section, wherein the first patient support facility is a wheelchair, and wherein said second patient support facility is a bed, stationary chair or commode, said method comprising:

- deploying said bar in a transfer position by removably engaging the lower ends of the first and second legs with respective first and second connectors rigidly secured to said first and second patient support facilities, respectively, in an orientation such that the bar stably secures the first and second patient support facilities to one another in a manner permitting the grip section to be grasped by a patient transferring between the patient support facilities.

2. The method of claim 1 wherein the bar is normally deployed in an exercise position with the lower end of the first leg secured to said first connector rigidly connected to a first side of the wheelchair and the second leg secured to a third connector rigidly connected to a second side of the wheelchair such that the grip section is disposed horizontally in front of the wheelchair.

3. The method of claim 2 wherein said first and third connectors include respective sockets configured to receive and engage the lower ends of said first and second legs, respectively, and wherein deploying said bar in said transfer position comprises:

- raising the support bar to simultaneously remove the first and second legs from said first and third connector sockets;
- inserting the lower end of the first leg into the first connector socket; and
- inserting the lower end of the second leg into said second connector secured to the second patient support facility.

4. The method of claim 3 further comprising attaching at least one elastic resistance band to said grip section to permit an occupant of the wheelchair to repetitively pull the band to exercise the occupant's upper body.

5. The method of claim 3 providing a foam pad surrounding at least a portion of the grip section to facilitate gripping of the grip section by an occupant of the wheelchair.

6. The method of claim 2 wherein said first and third connectors include respective sockets configured to receive and engage the lower ends of said first and second legs, respectively, and wherein deploying said bar in said transfer position comprises:

raising the support bar to simultaneously remove the first and second legs from said first and third connector sockets;

axially inserting the lower end of the first leg into the first connector socket and simultaneously axially inserting the lower end of the second leg into said second connector secured to the second patient support facility.

7. The method of claim 2 further comprising attaching at least one elastic resistance band to said grip section to permit an occupant of the wheelchair to repetitively pull the band to exercise the occupant's upper body.

8. The method of claim 2 providing a foam pad surrounding at least a portion of the grip section to facilitate gripping of the grip section by an occupant of the wheelchair.

9. A method of providing for stable transfer of a person from a wheelchair to another support facility, wherein said another support facility is a bed, stationary chair or commode, using a support bar having first and second legs depending substantially vertically from respective ends of a transversely extending grip section, and wherein lower ends of the legs can be selectively secured in respective connectors on opposite sides of the wheelchair with the grip section disposed horizontally in front of the wheelchair, said method comprising:

removing the support bar from the connectors on the opposite sides of the wheelchair;

placing the bar in a transfer position by engaging the lower end of the first leg with said another support facility and engaging the lower end of the second leg to one of said connectors on the wheelchair such that the bar stably secures the wheelchair to said another facility and the grip section can be grasped by a patient transferring between the wheelchair and said another support facility.

10. The method of claim 9 further comprising normally placing the support bar in an exercise position wherein the lower ends of the legs are secured in the respective connectors on the opposite sides of the wheelchair with the grip section disposed horizontally in front of the wheelchair.

* * * * *